United States Patent
Bloemen et al.

(10) Patent No.: US 7,149,040 B2
(45) Date of Patent: Dec. 12, 2006

(54) SCANNING DEVICE INCLUDING AN OBJECTIVE LENS FORMED OF TWO MATERIALS

(75) Inventors: Pascal Jean Henri Bloemen, Eindhoven (NL); Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 124 days.

(21) Appl. No.: 10/523,376

(22) PCT Filed: Jul. 16, 2003

(86) PCT No.: PCT/IB03/03251

§ 371 (c)(1),
(2), (4) Date: Feb. 1, 2005

(87) PCT Pub. No.: WO2004/015701

PCT Pub. Date: Feb. 19, 2004

(65) Prior Publication Data

US 2005/0275954 A1    Dec. 15, 2005

(30) Foreign Application Priority Data

Aug. 5, 2002   (EP)   .................. 02078218

(51) Int. Cl.
   *G02B 3/02*   (2006.01)
   *G11B 7/135*  (2006.01)
(52) U.S. Cl. .................. 359/719; 359/708; 359/718; 369/112.23

(58) Field of Classification Search ............... 359/708, 359/718, 719; 369/112.23
See application file for complete search history.

(56) References Cited

U.S. PATENT DOCUMENTS

| 4,319,945 A * | 3/1982 | Howden ................... 156/212 |
| 4,623,496 A | 11/1986 | Verhoeven et al. |
| 6,038,077 A * | 3/2000 | Braat .................... 359/642 |
| 6,665,132 B1 * | 12/2003 | Hendriks et al. ........... 359/819 |
| 6,995,929 B1 * | 2/2006 | Hendriks ................. 359/719 |
| 7,009,744 B1 * | 3/2006 | Hendriks et al. ........... 359/205 |
| 7,034,974 B1 * | 4/2006 | Hendriks et al. ........... 359/210 |
| 7,050,246 B1 * | 5/2006 | Hendriks ................. 359/793 |

OTHER PUBLICATIONS

M. Itonga et al; "Single Objective Lens Having Numerical Aperture 0.85 for a High Density Ooptical Disk System", Japan J. Appl. Phys. vol. 41, 2002, pp. 1798-1803, Part 1, No. 3B.

* cited by examiner

*Primary Examiner*—David N. Spector

(57) ABSTRACT

An optical scanning device (1) for scanning an information layer (4) of an optical record carrier (2), the information layer (4) being covered by a transparent layer (3) of thickness $t_d$ and refractive index $n_d$. The device comprises a radiation source (11) for generating a radiation beam (12, 15, 20) and an objective system (18) for converging the radiation beam on the information layer. The objective system is characterised in comprising a lens comprising a synthetic resin on a substrate, the total thickness t of the lens satisfying the condition: Formula (I), where $FWD+t_d/n_d<0.51$, and FWD is the free working distance between the lens (18) and carrier (2) and $\Phi$ is the entrance pupil diameter of the lens (18), where t, $t_d$, $\Phi$ and FWD are expressed in millimeters.

11 Claims, 4 Drawing Sheets

Type I

Type II

SCANNING DEVICE INCLUDING AN OBJECTIVE LENS FORMED OF TWO MATERIALS

FIELD OF THE INVENTION

The present invention relates to an optical scanning device for scanning an optical record carrier, to a lens system suitable for, but not limited to, use as an objective lens in such a scanning device, and to methods for manufacturing such a device and such a system.

BACKGROUND TO THE INVENTION

In optical recording, increasingly the trend is towards miniaturisation of both the optical record carriers and the devices used to scan (e.g. write to and/or read from) the carriers. Examples of optical record carriers include CDs (compact discs) and DVDs (digital versatile discs).

In order for the optical record carriers to be made smaller, without a decrease in information storage capacity, the information density on the carrier must be increased. Such an increase in information density must be accompanied by a smaller radiation spot for scanning the information. Such a smaller spot can be realised by increasing the numerical aperture (NA) of the objective system used for focusing a radiation beam in the scanning device on the record carrier. Consequently, it is desirable to have a lens with a high numerical aperture (e.g. NA=0.85).

Conventional high NA objective lenses consist of two elements in order to ease the manufacturing tolerances, at the expense of introducing an extra assembly step to align the elements making up the objective lens.

The Japanese article "Single Objective Lens Having Numerical Aperture 0.85 for a High Density Optical Disk System" by M Itonga, F Ito, K Matsuzaki, S Chaen, K Oishi, T Ueno and A Nishizawa, Jpn. J. Appl. Phys. Vol. 41. (2002) pp. 1798–1803 Part 1, No. 3B March 2002, describes a single objective lens, having two aspherical surfaces, with a relatively high NA of 0.85. The lens is made of glass. The lens diameter is 4.5 mm, and the lens has an aperture diameter of 3.886 mm. This single element lens does not require the extra alignment assembly step needed by the two-element objective lens. Because of the high value of NA, the objective lens becomes more susceptible to variations in the manufacturing process i.e. manufacturing tolerances. Therefore, for these high NA objective lenses the manufacturing tolerances play an even more important role in the designing process than was the case for objective lenses having a lower numerical aperture.

In order for scanning devices to decrease in size, it is desirable that the components within the scanning devices (such as the objective lens) are made as small as possible.

However, it is not possible to simply scale down large lens designs to produce smaller lenses, as the lens design is dependent upon the properties of the optical recording medium. For instance, the lens design is dependent upon the properties of the transparent layer that typically covers the information layer on an optical record carrier, and which the scanning radiation beam must traverse. In the scaling down process the thickness of the cover layer of the disc remains unaffected (the same record carrier is likely to be used for both the normal sized objective lens and the small sized objective lens). Hence, the design of a small sized objective lens suitable for scanning the optical record medium will be substantially different from the design of a normal sized objective lens.

Further, whilst it is desirable that the objective lens is formed of a single element (assembling two small elements is difficult and therefore rather expensive), forming a single element solely out of glass is relatively expensive. The glass moulding production process requires high temperatures to melt the glass, and relatively large forces to shape the melted glass, thus making the resulting lens a relatively expensive component.

A cheaper alternative method of manufacturing a single element lens is to form a synthetic resin on a flat or spherical substrate (such as glass). For instance, glass spheres are relatively cheap to manufacture, and so truncated glass spheres are ideal substrates. Synthetic resins may be applied to the surface of the substrate so as to provide the desired (e.g. aspherical) surface shape. U.S. Pat. No. 4,623,496 describes how such a liquid synthetic resin can be applied to a substrate, with the synthetic resin being subsequently cured so as to form a layer having a predetermined desired aspherical curved characteristic.

It will be appreciated that design constraints for lenses formed using a synthetic resin on a substrate will differ from design constraints for lens formed from a single substance such as glass. For instance, the synthetic resin will typically have a different refractive index than the substrate.

It will also be appreciated that as lenses are made smaller, high NA lenses remain susceptible to variations in the manufacturing process i.e. manufacturing tolerances.

FIG. 1A shows an example of an objective lens 18, having a glass body 200 with a substantially spherical surface 181, and a substantially flat surface 182. Such a glass body would subsequently have at least one layer of a synthetic resin applied to the first surface 181 so as to form an aspherical surface. It will be appreciated that if the glass body is formed or aligned incorrectly, then the performance of the lens formed with the addition of the resin will be impacted. The lens is of total thickness t along the optical axis (i.e. thickness of body plus resin layer(s)).

In the examples shown in FIGS. 1A–1D, two separate layers of resin 100, 102 are applied to respective surfaces 181, 182 of the glass body 200. Each layer of resin 181, 182 is shaped so as to form a respective aspherical surface.

Subsequent FIGS. 1B, 1C and 1D respectively illustrate how the substrate shape and orientation can vary due to variations in thickness, decentre and tilt of the two aspherical surfaces relative to the desired optical axis 19 (in each instance, the original position of the surface 181 is illustrated by a dotted line).

FIG. 1B illustrates the overall thickness of the lens being greater than the desired thickness, in this instance due to the spacing in between the surfaces 181, 182 being larger than desired. However, it will be appreciated that the two surfaces could in fact be spaced closer together than desired as well.

FIG. 1C illustrates decentre of the two aspherical surfaces. In this example, the glass body 200 has been located shifted in a direction perpendicular to the ideal position relative to the desired optical axis 19, with the centre of the aspherical surface 100 being off the desired optical axis 19, whilst the aspherical surface 102 remains centred on the axis 19.

FIG. 1D illustrates how the glass body, including surface 181, is tilted i.e. rotated in relation to the desired rotationally symmetric position along the principal axis, resulting in a tilt of the upper aspherical surface 100, relative to the lower aspherical surface 102.

It is an aim of embodiments of the present invention to provide an objective lens formed from a synthetic resin on a substrate material capable of withstanding reasonable manufacturing tolerances.

In optical scanning devices, radiation beams may enter the objective lens obliquely, due to inaccurate alignment of the objective lens within the scanning device, variations in the position of the recording carrier relative to the scanning device, or due to radiation beams being utilised that do not travel along the optical axis. For instance, such off-axis beams are typically used to provide information on positioning of the scanning radiation spot on the record carrier.

Such oblique beam entrance results in wave-front aberrations. Typically an allowance in the root mean square of the optical path difference ($OPD_{rms}$) of approximately $0.07\lambda$ (where $\lambda$ is the wavelength of the relevant radiation beam), in total is allowed for wave-front aberrations of the scanning beam for the total optical scanning device, such that the system is diffraction limited. It can be convenient to express the $OPD_{rms}$ in $m\lambda$ (where $0.001\lambda = 1\ m\lambda$). The field of the lens system is the area within which oblique beams generate an $OPD_{rms}$ of less than 15 $m\lambda$. The field of view of the lens system is twice the field.

It is an aim of embodiments of the present invention to provide an small sized high NA objective lens formed of a synthetic resin on a substrate that is tolerant to oblique beam entrance to the lens and tolerant for manufacturing errors.

SUMMARY OF THE INVENTION

In a first aspect, the present invention provides an optical scanning device for scanning an information layer of an optical record carrier, the information layer being covered by a transparent layer of thickness $t_d$ and refractive index $n_d$, the device comprising a radiation source for generating a radiation beam and an objective system for converging the radiation beam on the information layer, the objective system being characterised in comprising a lens comprising a synthetic resin on a substrate, the total thickness t of the lens satisfying the condition:

$$0.8 < \frac{t - 1.1\phi + 1.1}{1.18 - 2.28\left[FWD + \frac{t_d}{n_d}\right]} < 1.2$$

where $FWD + t_d/n_d < 0.51$, and FWD is the free working distance between the lens and carrier and $\phi$ is the entrance pupil diameter of the lens, where t, $t_d$, $\phi$ and FWD are expressed in millimetres.

By designing a lens to satisfy such constraints, the resulting lens is tolerant to oblique beam entrance and manufacturing errors.

In another aspect, the present invention provides a lens system comprising at least one lens for converging a radiation beam on an information layer of an optical record carrier, the information layer being covered by a transparent layer of thickness $t_d$ and refractive index $n_d$, the lens system being characterised in comprising a lens comprising a synthetic resin on a substrate, the total thickness t of the lens satisfying the condition:

$$0.8 < \frac{t - 1.1\phi + 1.1}{1.18 - 2.28\left[FWD + \frac{t_d}{n_d}\right]} < 1.2$$

where $FWD + t_d/n_d < 0.51$, and FWD is the free working distance between the lens and carrier and $\phi$ is the entrance pupil diameter of the lens, where t, $t_d$, $\phi$ and FWD are expressed in millimetres.

In a further aspect, the present invention provides a method for manufacturing a lens system comprising at least one lens formed of a synthetic resin on a substrate, for converging a radiation beam on an information layer of an optical record carrier, the information layer being covered by a transparent layer of thickness $t_d$ and refractive index $n_d$, the method comprising the steps of: forming the substrate, the total thickness t of the lens satisfying the condition:

$$0.8 < \frac{t - 1.1\phi + 1.1}{1.18 - 2.28\left[FWD + \frac{t_d}{n_d}\right]} < 1.2$$

where $FWD + t_d/n_d < 0.51$, and FWD is the free working distance between the lens and carrier and $\phi$ is the entrance pupil diameter of the lens, where t, $t_d$, $\phi$ and FWD are expressed in millimetres.

In another aspect, the present invention provides a method of manufacturing an optical scanning device for scanning an information layer of an optical record carrier, the information layer being covered by a transparent layer of thickness $t_d$ and refractive index $n_d$, the method comprising the steps of: providing a radiation source for generating a radiation beam; providing a lens system for converging the radiation beam on the information layer, the lens system being characterised in comprising a lens comprising a synthetic resin on a substrate, the total thickness t of the lens satisfying the condition:

$$0.8 < \frac{t - 1.1\phi + 1.1}{1.18 - 2.28\left[FWD + \frac{t_d}{n_d}\right]} < 1.2$$

where $FWD + t_d/n_d < 0.51$, and FWD is the free working distance between the lens and carrier and $\phi$ is the entrance pupil diameter of the lens, where t, $t_d$, $\phi$ and FWD are expressed in millimetres.

Other aspects of the invention will be apparent from the dependent claims.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF THE EMBODIMENTS

Figure 1A:
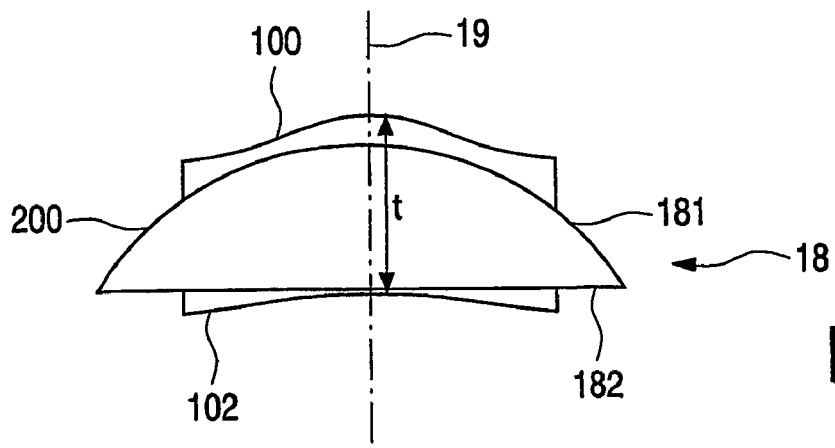
FIGS. 1A, 1B, 1C and 1D show a lens having a substantially spherical first surface, and a substantially flat surface with the spherical surface being respectively: in the desired position, too far away from the second surface, decentred with respect to the second surface, and tilted with respect to the second surface.
Figure 1B:
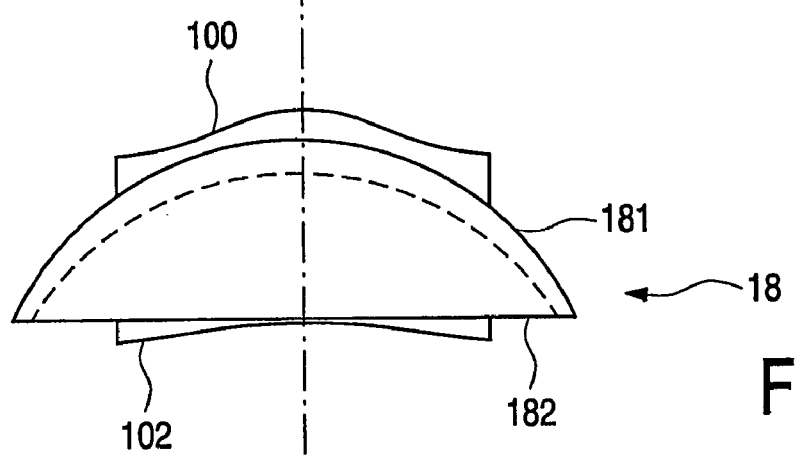
Figure 1C:
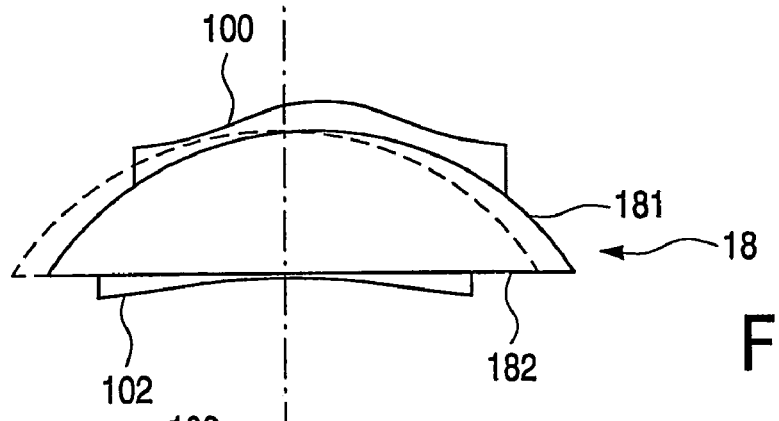
Figure 1D:
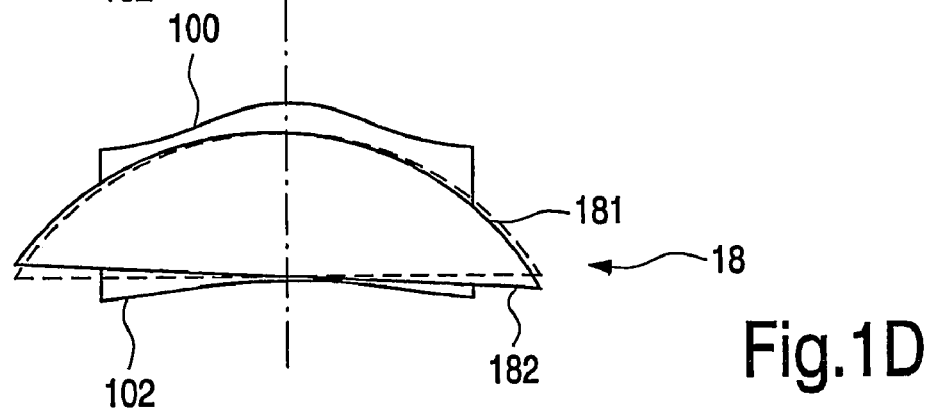
Figure 2:
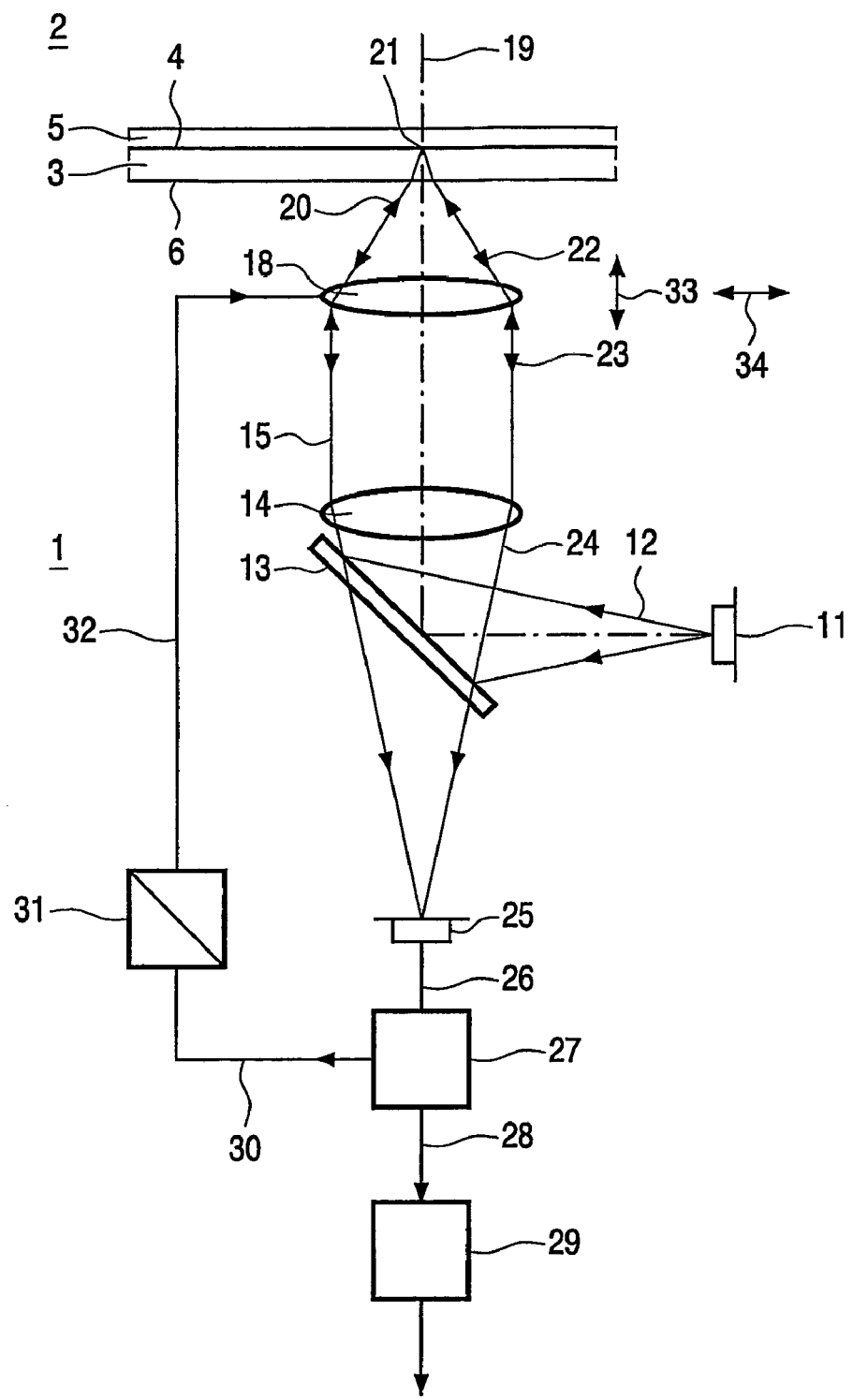
FIG. 2 shows a device for scanning an optical record carrier including an objective system.

FIG. 2 shows a device 1 for scanning an optical record carrier 2, including an objective system 18 according to an embodiment of the present invention. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer.

Alternatively, the transparent layer may have the sole function of protecting the information layer, while the mechanical support is provided by a layer on the other side of the information layer, for instance by the protection layer 5 or by a further information layer and a transparent layer connected to the information layer 4. Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetisation different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a collimator lens 14, which converts the diverging beam 12 into a collimated beam 15. The collimated beam 15 is incident on an objective system 18.

The objective system may comprise one or more lenses and/or a grating. The objective system 18 has an optical axis 19. The objective system 18 changes the beam 15 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals.

One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot.

The focus error signal and the radial error signal are fed into a servo circuit 31, which converts these signals to servo control signals, 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective system 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 2 may be adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

In order to provide a single element high-NA (NA>0.65) objective lens for use in an objective system as described above, we propose that the lens is made using a thin aspherical correction layer of a synthetic resin on surface of a substrate (such as glass), in similar manner as proposed in U.S. Pat. No. 4,623,496. This layer is sometimes referred to as a replica layer. In order to make the glass body cheap to manufacture, it is preferable that the body has the shape of a truncated glass sphere. Suitable synthetic resins can be formed from monomeric or oligomeric acrylates, with the synthetic resin being subsequently cured under UV light. Diacryl is one example of such a resin. Diacryl has a refractive index of 1.5987 at a wavelength of 405 nm and Abbe number 34.5.

Figure 3:
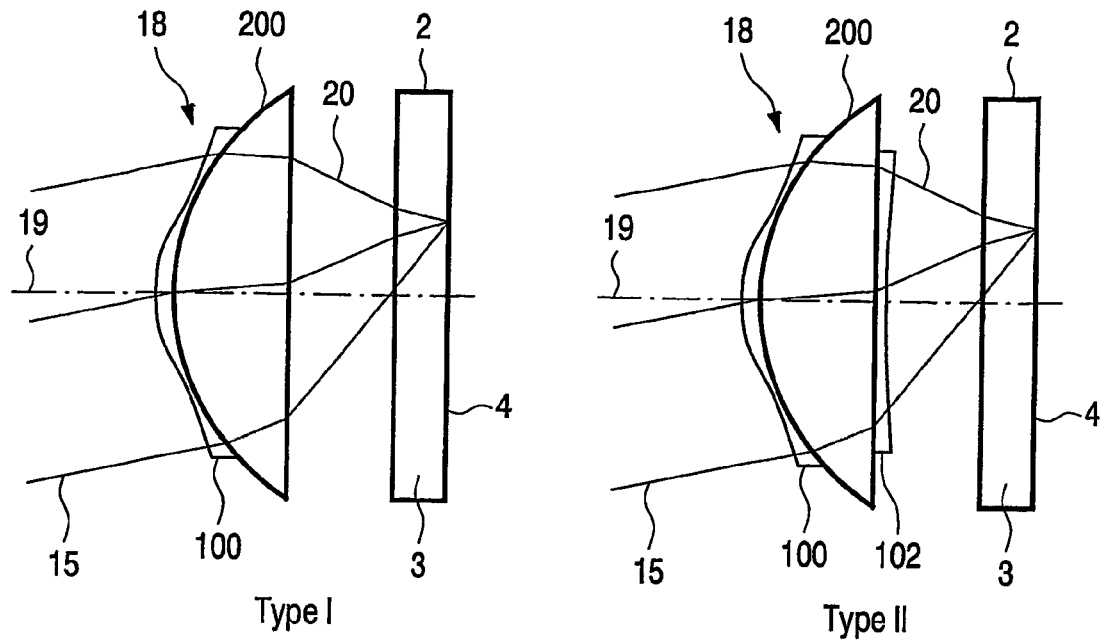
FIG. 3 shows two alternative types of lens designs utilised by embodiments of the present invention.

FIG. 3 illustrates two alternative lens designs (labelled respectively Type I and Type II). In both instances, the lenses are indicated positioned in relation to a respective optical record carrier 2, having an information layer 4 and a transparent covering layer 3. In both cases, an incoming radiation beam 15 is being converged 20 onto the information layer 4, through the covering transparent layer 3. It will be seen that the radiation beam 15, 20 is at an oblique angle of incidence to the optical axis 19 of the lens 18.

Both type I and type II lenses comprise a glass body 200 in the shape of a truncated glass sphere. Such a shape can be formed by forming a glass sphere, and then cleaving the glass sphere. Such a cleaved surface is relatively flat.

Type I lenses are characterised in only having a single aspherical surface. This surface is formed by applying the synthetic resin 100 to the curved surface of the truncated glass sphere substrate. In use, this aspherical surface of the lens is facing the radiation source.

Type II lenses are characterised in having two aspherical surfaces. A type II lens can be envisaged as a type I lens, with an additional aspherical surface formed on the flat side of the glass body (i.e. the surface of the glass body which, in use, is adjacent to the recording medium 2). Such a second aspherical surface is formed by a further layer 102 of synthetic resin.

Below will now be described in more detail the various preferred design constraints of type I and type II lenses, followed by a table summarising the parameters of three example lenses. In this table, example lens 2 corresponds to a type I lens, and example lenses 1 and 3 to type II lenses. Note that a type I lens can be considered as a special case of type II i.e. the case where the second aspherical surface is flat.

TYPE I

Type I lenses are more cost effective than type II lenses, as they require a synthetic layer 100 to be added to only one surface of the glass body 200.

Preferably, the total thickness t of the lens (the thickness along the optical axis 19) complies with the relationship:

$$0.8 < \frac{t - 1.1\phi + 1.1}{1.18 - 2.28\left[FWD + \frac{t_d}{n_d}\right]} < 1.2 \quad (1)$$

where $FWD + t_d/n_d < 0.51$ and where $\phi$ is the entrance pupil diameter of the objective lens. It is assumed that the relevant thickness and distance dimensions (t, FWD, $\phi$ and $t_d$) are measured in millimetres.

Even more preferably, the thickness t of the lens complies with:

$$0.9 < \frac{t - 1.1\phi + 1.1}{1.18 - 2.28\left[FWD + \frac{t_d}{n_d}\right]} < 1.1 \quad (2)$$

The free working distance corresponds to the distance the lens can be moved before contacting the record carrier i.e. the distance from the surface of the lens facing the record carrier to the surface of the transparent layer 3, as measured along the optical axis.

Preferably, the refractive index n of the glass body of the lens complies with:

$$-0.05 < n - 2.49 + 2.79\left(\frac{FWD + \frac{t_d}{n_d}}{F}\right) - 2.28\left(\frac{FWD + \frac{t_d}{n_d}}{F}\right)^2 < 0.05 \quad (3)$$

where FWD is the free working distance, $t_d$ the thickness of the transparent layer 3, $n_d$ the refractive index of the transparent layer 3, and where F is the focal length of the lens.

In use in a scanning device, the lens might be used in combination with different wavelengths of radiation (different wavelengths may be used to read and write data). Alternatively the wavelength of the radiation source (e.g. a laser) may change as a function of the power of the radiation beam (different powers may be utilised to read and write data to an information recording medium). In order that the lens is tolerant to such variations in wavelength, it is preferable that the Abbe number of the glass body is greater that 40.

TYPE II

This design consists of two aspherical surfaces. It is preferable that the second aspherical surface (the aspherical surface formed on the flat side of the glass body) is substantially flat. Preferably, the absolute value of the best fit radius R of the surface complies with:

$$|R| > 5\frac{n_r - 1}{NA}\phi \quad (4)$$

where $\phi$ is the entrance pupil diameter of the lens, NA is the numerical aperture and $n_r$ the refractive index of the resin. The best fit radius R is the radius of a sphere which has minimal root mean square deviation from the aspherical surface.

Similarly, it is preferable that the normalised paraxial optical power P (the optical power of the surface divided by the total optical power of the lens system) of the second aspherical surface of the lens complies with the relationship:

$$-0.1 < P < 0.1 \quad (5)$$

Preferably, the total thickness t of the lens complies with relation (1).

Even more preferably, the total thickness t complies with relation (2).

Preferably, the refractive index n of the glass body of the lens complies with relation (3).

Again, in order that the lens is sufficiently tolerant to vacations in wavelength of the radiation, it is preferable that the Abbe number of the glass body is greater than 40.

Table 1 provides details of three explicit lens designs optimised in order to be tolerant for field, thickness variation of the substrate, decentre of the aspheric surfaces and tilt between the aspheric surfaces according to embodiments of the present invention. Example 2 is of type I (and thus a special case of type II) while example 1 and 3 are of type II. The performance of the various designs, including examples 1 and 3, is indicated within FIGS. 4, 5 and 6, which were used to derive the above preferred design relationships. The performance of the explicit design example 2 is tabulated in table 2.

TABLE 1

| | Example | | |
|---|---|---|---|
| | 1 | 2 | 3 |
| Numerical aperture | 0.85 | 0.85 | 0.85 |
| Entrance pupil diameter (mm) | 1.0 | 1.0 | 1.0 |
| Wavelength (nm) | 405 | 405 | 405 |
| Glass body (glass type) | N-LAK14 | S-LAM60 | LASFN9 |
| Refractive Index glass body | 1.7180 | 1.7689 | 1.8983 |
| Abbe number glass body | 55.4 | 49.3 | 32.17 |
| Body radius | 0.5175 | 0.5302 | 0.5570 |
| Body thickness (mm) | 0.6411 | 0.6697 | 0.6321 |
| Refractive index resin | 1.5987 | 1.5987 | 1.5987 |
| Abbe number resin | 34.5 | 34.5 | 34.5 |
| Free working distance FWD (mm) | 0.15 | 0.15 | 0.15 |
| 1st asphere | | | |
| Replica thickness center (μm) | 20 | 18.8 | 15.8 |

TABLE 1-continued

| | Example | | |
|---|---|---|---|
| | 1 | 2 | 3 |
| B2 (mm$^{-2}$) | 1.154981 | 1.1282466 | 1.058627 |
| B4 (mm$^{-4}$) | 0.778878 | 0.7171389 | 0.554093 |
| B6 (mm$^{-6}$) | 0.436929 | 0.2726619 | 0.13553 |
| B8 (mm$^{-8}$) | 2.201988 | 1.9733778 | 0.34716 |
| B10 (mm$^{-10}$) | −8.35349 | −9.2510925 | −6.98564 |
| B12 (mm$^{-12}$) | −22.3366 | −17.943089 | −10.4856 |
| 2nd asphere | | | |
| Replica thickness center (μm) | 30 | 0 | 30 |
| B2 (mm$^{-2}$) | −0.12437 | 0 | 0.28866 |
| B4 (mm$^{-4}$) | 1.163883 | 0 | −1.59621 |
| B6 (mm$^{-6}$) | −12.6129 | 0 | 5.803061 |
| B8 (mm$^{-8}$) | 89.0167 | 0 | 21.4475 |
| B10 (mm$^{-10}$) | −272.507 | 0 | −232.761 |
| B12 (mm$^{-12}$) | 0 | 0 | 0 |
| Best fit radius (mm) | −6.2407 | infinity | 2.2992 |
| Normalised power 2$^{nd}$ asphere | 0.09 | 0 | −0.20 |

TABLE 2

| Performance of example 2 | Root mean square wavefront aberration WFA (ml) |
|---|---|
| 0.1° field | 8.1 |
| 1 μm thickness difference lens body | 9.8 |
| 0.01° tilt between asphere and flat exit surface | 8.8 |
| 10 μm decenter between asphere and flat exit surface | 0 |

The front and back surfaces of the example lenses each have a rotational symmetric aspherical shape which is given by the equation:

$$z(r) = \sum_{i=1}^{6} B_{2i} r^{2i}$$

with z the position of the surface in the direction of the optical axis in millimetres, r the distance to the optical axis in millimetres, and $B_k$ the coefficient of the k-th power of r. The values of $B_k$ for three different example lens designs are listed in Table 1, in which the 1$^{st}$ asphere is assumed to be the surface of the lens facing the radiation source. To calculate the normalised optical power P of the second aspherical surface the following formula is used $$P = B_2(1-n_r)\phi/NA$$

where $B_2$ is the first aspherical coefficient of the second surface, $n_r$ the refractive index of the resin, φ is the entrance pupil diameter of the objective lens and NA the numerical aperture.

Examples 1, 2 and 3 fulfil the requirements of equations (1) and (2). Furthermore, example 2 fulfils the requirement of equation (3). Examples 1 and 2 fulfil both the requirements of equations (4) and (5). Finally, the Abbe number of the glass bodies of examples 1 and 2 is larger than 40.

Figure 4:
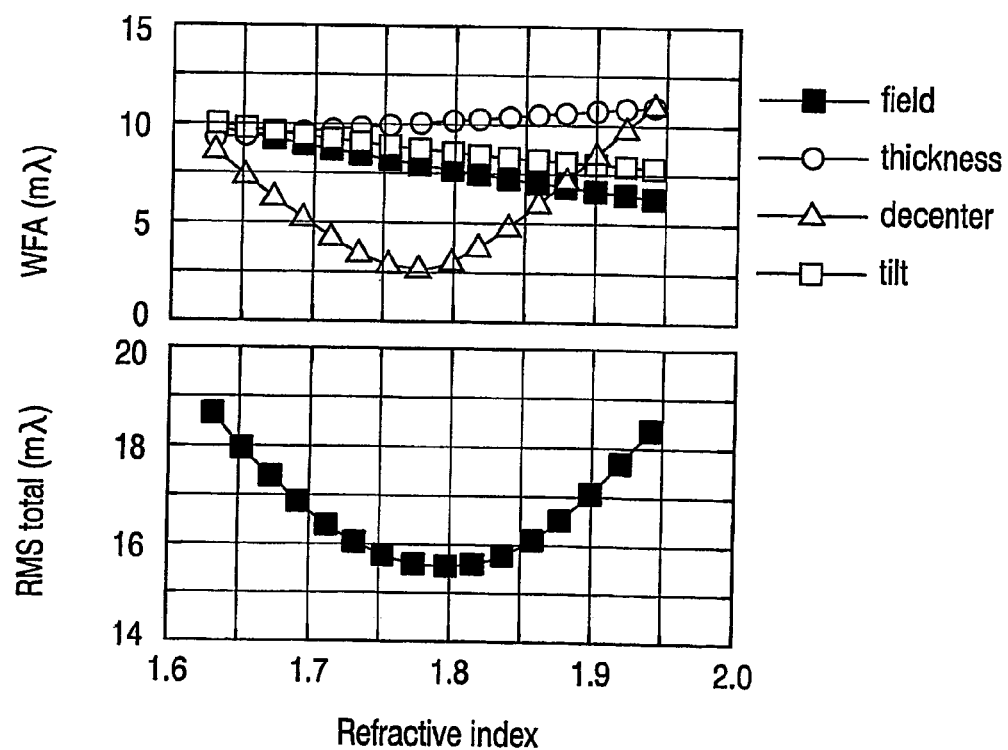
FIG. 4 illustrates, as an average of different objective lens designs, the wave-front abberation arising from respectively field, thickness, decentre and tilt as a function of refractive index, as well as the root mean square total wave-front abberation arising from these four factors.

FIG. 4 shows the root mean square of the wave-front aberrations due to an oblique radiation beam entrance to the lens of 0.1° field, with the glass substrate body of the lens having a 1 μm thickness difference (the deviation of the actual body from the desired thickness t), 10 μm decenter aspheres and 0.01° tilt aspheres for various designs, including examples 1 and 3 of the objective lens designs tabulated in table 1, as a function of the refractive index of the objective lens. The individual root mean square of the wave-front aberration (WFA) arising due to each of the contributions from the field, thickness, decenter and tilt is indicated, as is the root mean square (RMS) total wave-front aberration. Note that the performance of lens design example 2 (see table 2) is in the with FIG. 4, except for decentre of the asphere which is exactly zero for example 2 because of the flat exit surface.

Figure 5:
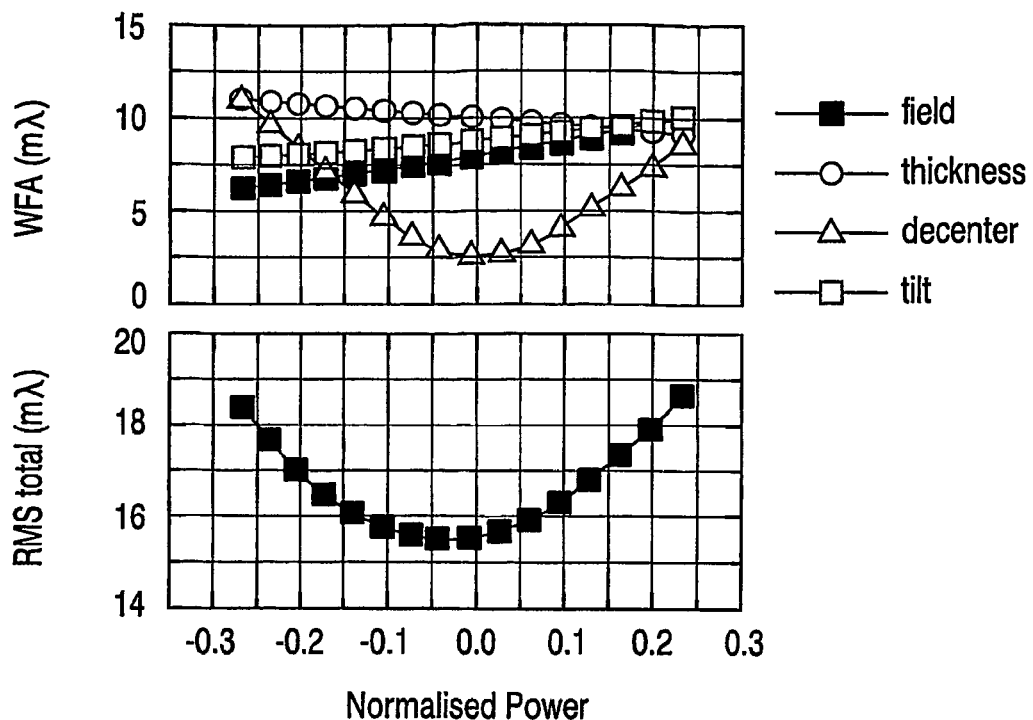
FIG. 5 illustrates, as an average of different objective lens designs, the wave-front abberation arising from respectively field, thickness, decentre and tilt as a function of normalised power of the surface of the objective lens facing the record carrier, as well as the root mean square total wave-front abberation arising from these four factors.

Similarly, FIG. 5 shows the root mean square of the wave-front aberration due to 0.1° field, 1 μm thickness difference, 10 μm decenter aspheres and 0.01° tilt aspheres for the same objective lens designs, as a function of normalised power of the second surface of the objective lens (the lens surface facing the recording medium).

In both FIGS. 4 and 5, the lenses have a numerical aperture=0.85, and an entrance pupil diameter of 1.0 mm. The aspherical surface(s) is (are) formed by a layer of Diacryl upon a glass body. The glass body is shaped as a truncated glass sphere. The radiation beam has a wavelength λ=405 nm, and a free working distance (FWD) of 0.15 mm was utilised, with a recording medium having a covering layer (transparent layer 3) thickness of 0.1 mm, of refractive index 1.6223.

Figure 6:
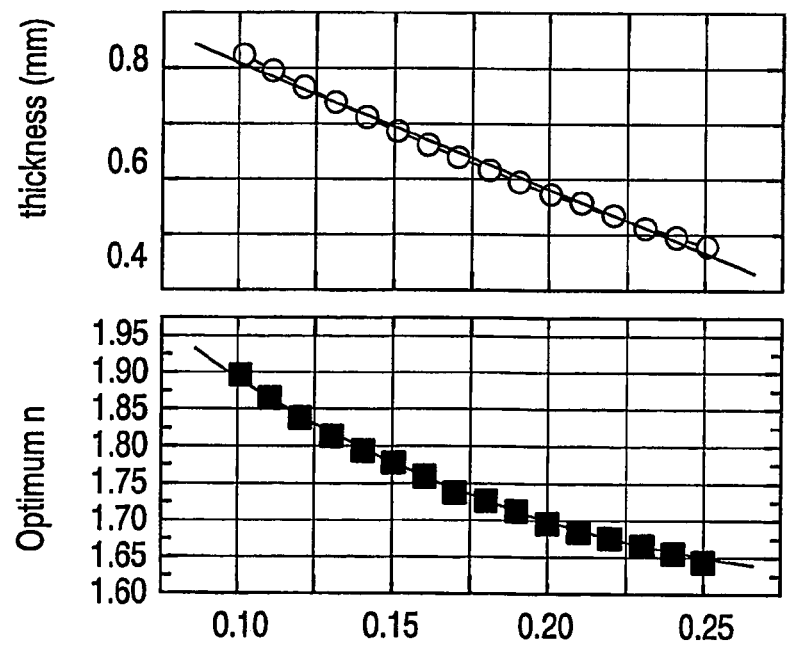
FIG. 6 illustrates the average optimum thickness of the objective lens and the optimum refractive index n for the substrate of the objective lens for differing objective lens designs, as a function of the Free Working Distance (FWD).

FIG. 6 shows the optimum thickness of the objective lens and the optimum refractive index of the glass body for various objective lens designs including example 1 and 3 of the designs tabulated in table 1 as a function of the free working distance (FWD). This data assumes that each of the lenses has a NA=0.85, and an entrance pupil diameter 1.0 mm. A radiation beam of wave length λ=405 nm was utilised, in conjunction with a recording medium (e.g. a disk) having a covering layer thickness of 0.1 mm and a refractive index of 1.6223.

FIG. 4 shows that as the refractive index n increases, the field and tilt tolerance increase (i.e. the WFA decreases), whilst the thickness tolerance decreases. The decenter tolerance shows an optimum (i.e. minimum) near n=1.78. Combining all four tolerances shown in the figure, it is shown that the optimum lens designs are found when the relationship shown in equation 3 holds.

FIG. 5 shows that, with increasing normalised power of the second surface, the disc field and tilt tolerance decreases, while the thickness tolerance increases. The decenter tolerance shows an optimum near a normalised power (P) of −0.025.

In both FIGS. 4 and 5, the minimum of the decenter curve does not correspond to zero WFA as is the case for example 2 of table 1. This means that the second asphere in the case of type II designs near zero power is not flat, due to at least one of the coefficients $B_4$–$B_{12}$ being non-zero.

FIG. 6 shows that the optimum total thickness of the objective lens along the optical axis (i.e. the total thickness of the glass body and the resin layers) and the optimum refractive index n of the glass body of the objective lens both decrease for increasing free working distance (FWD). Providing fits to the points illustrated in FIG. 6, shows that the optimum refractive index ($n_{opt}$) is given by $$n_{opt} = 2.21794 - 3.9321*FWD + 6.60614*FWD^2$$

and the optimum thickness as a function of FWD is given by $$t = 1.03616 - 2.27542*FWD$$

In both cases FWD and t are expressed in millimetres.

From these specific results and FIGS. 4, 5 and 6, taking into account scaling relationships, it has been possible to deduce the optimum lens design parameters shown in equations 1, 2, 3 and 5.

Finally, when equation (4) holds the resin thickness to be applied on the substantially flat side of the glass body remains small. As a result, the effect of any shrinkage of this layer during manufacturing remains small too, which eases the manufacturing of the objective lens.

It will be appreciated that different embodiments of the invention can be applied in relation to a variety of lens systems. Preferably, embodiments are utilised in respect of lens systems that have a numerical aperture of greater than 0.7. Preferably, lens systems in accordance with embodiments have an entrance pupil diameter of less than 2 mm, and even more preferably, less than 1.5 mm. Preferably, embodiments are utilised in conjunction with radiation beams having a wavelength of less than 600 nm, including beams having wavelengths of approximately 405 nm.

Whilst the above embodiments have been described in conjunction with lenses formed only of the resin diacryl on a glass substrate, it will be appreciated that the parameters of the present invention are appropriate for lens designs formed of any synthetic resin on any transparent substrate. Suitable classes of materials for the resin are aromatic and aliphatic di-(meth-)acrylates, aromatic and aliphatic bis-epoxides, bis-oxetanes, bis-vinylethers. More specificaly a bisphenol A based dimethacrylate ("diacryl 101", also known as 2,2-Bis(4-methacryloxyphenyl)propane) can be used.

In view of the above examples, it will be appreciated that embodiments of the invention can be used to provide objective lenses formed from a synthetic resin on a substrate capable of withstanding reasonable manufacturing tolerances. Further, embodiments of the present invention are tolerant to oblique beam entrance to the lens.

The invention claimed is:

1. An optical scanning device for scanning an information layer of an optical record carrier, the information layer being covered by a transparent layer of thickness $t_d$ and refractive index $n_d$, the device comprising a radiation source for generating a radiation beam and an objective system for converging the radiation beam on the information layer, the objective system being characterised in comprising a lens comprising a synthetic resin on a substrate, the total thickness t of the lens satisfying the condition:

$$0.8 < \frac{t - 1.1\phi + 1.1}{1.18 - 2.28\left[FWD + \frac{t_d}{n_d}\right]} < 1.2$$

where $FWD + t_d/n_d < 0.51$, and FWD is the free working distance between the lens and carrier and $\phi$ is the entrance pupil diameter of the lens, where t, $t_d$, $\phi$ and FWD are expressed in millimetres.

2. A device as claimed in claim 1, wherein the total thickness t of the lens satisfies the condition:

$$0.9 < \frac{t - 1.1\phi + 1.1}{1.18 - 2.28\left[FWD + \frac{t_d}{n_d}\right]} < 1.1$$

3. A device as claimed in claim 1, wherein the refractive index n of the substrate satisfies the condition:

$$-0.05 < n - 2.49 + 2.79\left(\frac{FWD + \frac{t_d}{n_d}}{F}\right) - 2.28\left(\frac{FWD + \frac{t_d}{n_d}}{F}\right)^2 < 0.05$$

where F is the focal length of the lens.

4. A device as claimed in claim 1, wherein the Abbe number of the substrate is greater than 40.

5. A device as claimed in claim 1, wherein the surface of the lens arranged to face the record carrier has a best fit radius satisfying the condition:

$$R > 5\frac{n_r - 1}{NA}\phi$$

where $\phi$ is the entrance pupil diameter of the lens, NA is the numerical aperture of the lens, and $n_r$ is the refractive index of the resin.

6. A device as claimed in claim 1, wherein the normalised optical power P of the surface of the lens arranged to face the record carrier satisfies the condition:

$$-0.1 < P < 0.1$$

7. A lens system comprising at least one lens for converging a radiation beam on an information layer of an optical record carrier, the information layer being covered by a transparent layer of thickness $t_d$ and refractive index $n_d$, the lens system being characterised in comprising a lens comprising a synthetic resin on a substrate, the total thickness t of the lens satisfying the condition:

$$0.8 < \frac{t - 1.1\phi + 1.1}{1.18 - 2.28\left[FWD + \frac{t_d}{n_d}\right]} < 1.2$$

where $FWD + t_d/n_d < 0.51$, and FWD is the free working distance between the lens and carrier and $\phi$ is the entrance pupil diameter of the lens, where t, $t_d$, $\phi$ and FWD are expressed in millimetres.

8. A lens system as claimed in claim 7, wherein said substrate is glass.

9. A method for manufacturing a lens system comprising at least one lens formed of a synthetic resin on a substrate, for converging a radiation beam on an information layer of an optical record carrier, the information layer being covered by a transparent layer of thickness $t_d$ and refractive index $n_d$, the method comprising the steps of:

forming the lens, the total thickness t of the lens satisfying the condition:

$$0.8 < \frac{t - 1.1\phi + 1.1}{1.18 - 2.28\left[FWD + \frac{t_d}{n_d}\right]} < 1.2$$

where $FWD + t_d/n_d < 0.51$, and FWD is the free working distance between the lens and carrier and $\phi$ is the entrance pupil diameter of the lens, where t, $t_d$, $\phi$ and FWD are expressed in millimetres.

10. A method as claimed in claim 9, further comprising the step of forming an aspherical surface on said substrate by applying a synthetic resin to a surface of said substrate.

11. A method of manufacturing an optical scanning device for scanning an information layer of an optical record carrier, the information layer being covered by a transparent layer of thickness $t_d$ and refractive index $n_d$, the method comprising the steps of:

providing a radiation source for generating a radiation beam;

providing a lens system for converging the radiation beam on the information layer, the lens system being characterised in comprising a lens comprising a synthetic resin on a substrate, the total thickness t of the lens satisfying the condition:

$$0.8 < \frac{t - 1.1\phi + 1.1}{1.18 - 2.28\left[FWD + \frac{t_d}{n_d}\right]} < 1.2$$

where $FWD + t_d/n_d < 0.51$, and FWD is the free working distance between the lens and carrier and $\phi$ is the entrance pupil diameter of the lens, where t, $t_d$, $\phi$ and FWD are expressed in millimetres.

* * * * *